Patented Jan. 28, 1941

2,230,199

UNITED STATES PATENT OFFICE 2,230,199

GLASS MANUFACTURE

Frank J. Dobrovolny, Niagara Falls, N. Y., assignor to E. I. du Pont de Nemours & Company, Wilmington, Del., a corporation of Delaware No Drawing. Application January 14, 1937,
Serial No. 120,613

3 Claims. (Cl. 106—36.1)

This invention relates to the manufacture of glass and more particularly to the preparation of molten glass, preparatory to the production of glass articles.

Most glass is made by fusing together silica and an alkali metal carbonate, together with various other ingredients such as lime, feldspar, etc. which depend on the type of glass desired. In making any glass composition it is essential to dissolve the silica or other siliceous material with a flux, and alkali metal carbonates usually are used for this purpose. Other alkali metal salts, e. g. the sulfates, are sometimes used in place of or in addition to the carbonates.

A number of glasses contain materials which make them colored, opaque or opalescent or impart other desired properties to the glass. In many cases, the added materials are relatively volatile and hence if the glass is heated too long or over-heated, the volatile material tends to be driven off. For example, ruby glass usually contains selenium compounds which are relatively volatile and certain opal glasses contain halogen compounds, e. g. fluoride, which are relatively volatile. Hence, in making ruby glass, opal glass and other glasses which contain more or less fugitive constituents, much care must be exercised to melt the ingredients together quickly and to avoid prolonged heating or over-heating. This is difficult, since furnace design is limited by the high temperatures required and mechanical stirring is impracticable. Some stirring action is obtained by the carbon dioxide evolved from the soda ash and other carbonates generally used but this does not greatly increase the rate of fusion and the evolved gases appear to assist rather than retard the escape of volatile materials.

An important property of a commercial glass product is its appearance. In many glass products, high lustre is desired and special types of glass have been formulated to produce a high lustre. In making colored glasses, the exact shade of color to give the most pleasing appearance is an important consideration. For example, opal glass is preferred which has a "warm" color, as contrasted with a "dead white" appearance. Another desideratum in the glass making art is to increase the silica content of glass, since useful properties such as strength, durability and resistance to heat are improved as the silica content is increased. The difficulty in making a high silica glass is that the fusion of the glass mix is more difficult as the ratio of silica to flux is increased and also the melt tends to be more viscous and have poorer working qualities.

An object of the present invention is to provide a method for facilitating the fusion of siliceous compositions to make glass, whereby mixtures having relatively high melting points may be fused without employing excessively high furnace temperatures and the time required for fusing ordinary glass types may be shortened. Another object is to produce a glass melt having lower viscosity and one which is more easily handled in molding, pressing and blowing operations to produce glass articles more readily fire polished and which have fewer flaws resulting from forming operations. A further object is to produce glass having a higher luster for a given chemical composition (as shown by analysis) of the finished product. Another object is to provide an improved method for making glass by fusing a mixture containing one or more relatively volatile ingredients. Another object is to shorten the time required for fusing a glass mix, thereby decreasing the amount of volatile material which escapes from the melt. A further object is to provide improved methods for making opal glass and ruby glass. Other objects will be apparent hereinafter.

The above objects are attained in accordance with the present invention by employing alkali metal monoxide as flux in glass mixes. The monoxide may be used as the sole fluxing agent or may be used together with carbonate or other flux. For example, my invention may be practiced by replacing part or all of the alkali metal carbonate commonly used in a glass mix with an alkali metal monoxide. For example, in making a glass by fusing a mix which contains soda ash, part or all of the soda ash may be replaced by the molar equivalent of sodium monoxide. It has been found that the alkali metal monoxide reacts with silica or other siliceous materials more rapidly than does the corresponding carbonate or hydrate and also the reaction of the monoxide generates large amounts of heat. Since, in the normal method of operation, the monoxide is uniformly distributed throughout the mix before fusing the heat of reaction with the silica results in an internal heating of the mass which supplements the external heating by the furnace gases. As a result, the time required to cause initial fusion of the mix is materially shortened, thus decreasing correspondingly the loss of volatile constituents such as fluorides, selenides and the like, and mixes having high melting points are more readily fused.

In addition to facilitating fusion, I have found that the addition of alkali metal monoxide to a glass mix results in a marked improvement of the properties of the molten glass and the finished glass product. The physical properties of the melt are markedly changed, to impart lower viscosity and the molten glass is easier to handle in the various forming operations such as molding and blowing. The character of the finished products also is markedly improved, the glass always having a higher lustre. In opal and colored glasses, the color appearance of the finished glass is improved; for example, I have found that by replacing around 50% of soda ash in an opal glass mix with its molar equivalent weight of sodium monoxide, the color appearance is greatly improved, having a "warmer" tone. When compared, glasses made with and without the monoxide are readily distinguished by their appearance, although the usual chemical analyses of the two glasses are substantially identical.

The above results lead me to believe that by fusing a mixture containing alkali metal monoxide in place of the usual fluxes, a novel type of glass is produced in which the silicon, oxygen and alkali metal are chemically combined in a different fashion than in glasses where silica is fused with an alkali metal salt such as carbonate.

It has been proposed heretofore to combine a fused salt electrolysis cell with a glass furnace in such manner that metallic sodium is generated by electrolysis of sodium chloride, whereby the sodium, rising to the surface of the glass melt, is then oxidized to sodium monoxide. In this proposed operation, silica and other ingredients are fed to the melt from above, near the point where the sodium monoxide is formed and become fused with the monoxide. The purpose of this operation is to utilize the heat of oxidation to assist in heating the glass furnace and to utilize cheap common salt as the source of soda in place of the more expensive soda ash. This method is distinctly different from the herein described invention, in which alkali metal monoxide is mixed with silica and other glass ingredients and the mixture then heated to fusion, the result being that the heat of reaction between the monoxide and the silica causes internal heating of the mass and more rapid solution of the silica. Furthermore, the above proposed method inevitably causes introduction of sodium chloride into the glass melt and so far as I am aware has never been successfully utilized for glass manufacture.

In practicing the present invention the composition of the glass mix selected may be unchanged, except that all or part of the alkali metal carbonate used is replaced by its molar equivalent of the corresponding alkali metal monoxide. Thus, sodium monoxide may be used in any mix where soda ash is commonly employed. In some cases it is preferable to replace about 40–60% of the carbonate with the monoxide, to obtain the full effect of the monoxide. For example, in a batch furnace, it is usually preferable to leave in sufficient carbonate to cause substantial gas evolution in the melt. In the continuous type of furnace, where the motion of the flowing melt causes more or less stirring of the melt, carbonate or other gas-forming ingredients may be omitted without disadvantage.

In its broader aspects, my invention comprises fusing a subdivided mixture containing alkali metal monoxide and silica or other siliceous material, with or without other desired constituents. The proportion of the monoxide may be varied between 1 and 15% by weight of the mix with good results; but the invention is not restricted to that exact range of proportions. I prefer to employ sodium monoxide as that is cheaper and more readily available than other alkali metal monoxides. However, for special types of glasses, the monoxides of other alkali metals, e. g. potassium, lithium, etc., may be used, either alone or in conjunction with sodium monoxide.

In practicing my invention, care should be taken that all ingredients of the glass mix are substantially dry before bringing them in contact with the monoxide. Any moisture present will quickly react with the monoxide to convert it into the corresponding hydroxide. This has the result of decreasing the effectiveness of the monoxide, since the advantageous effects of the monoxide cannot be secured by adding alkali metal hydroxide to the glass mix. Grinding and mixing of the ingredients to be melted, the melting and fining operations may be those commonly employed in making glass melts.

As a result of the presence of the monoxide, the time required to completely fuse all ingredients except the silica (i. e., to reach the "batch free" condition) is greatly decreased for a given furnace temperature. Also, the time required to reach the "sand free" condition (disappearance of grains of silica in the melt) is correspondingly shortened. The loss in volatile materials consequently is lower and the final glass product is more uniform and there are fewer defective pieces.

The present invention may be illustrated by the manufacture of opal glass in which a fluorine compound, for example a fluoride such as fluorspar, is utilized to impart opalescence. In making this type of opal glass by methods used heretofore, considerable loss of fluorine compound occurs during the fusion of the mix and it has been found that the greatest loss of fluorine occurs during the time required to bring the dry mix to an initial state of fusion ("batch free" condition). Typical formulas for the mix to be fused are as follows:

*Opal glass batches*

|  | A | B | C |
|---|---|---|---|
|  | Pounds | Pounds | Pounds |
| Sand | 100 | 100 | 100 |
| Soda ash | 38 | 35 | 35 |
| Fluorspar | 18 | 24 | 20 |
| Feldspar | 40 | 28 | 25 |
| Kryolith | 4 | 14 | 20 |
| Zinc oxide | 4 | 4 |  |
| Niter | 2 | 3 | 5 |
| Red lead | 13 |  |  |
| Borax | 2 | 4 | 1 |
| Arsenic | 1 | 2 | 1 |

In one method of practicing the present invention 40 to 60% of the soda ash in the above formulas will be replaced by a molar equivalent of sodium monoxide. For example, the following formulas may be used:

|  | A | B | C |
|---|---|---|---|
|  | Pounds | Pounds | Pounds |
| Sand | 100 | 100 | 100 |
| Sodium monoxide | 11 to 13.3 | 10.2 to 12.2 | 10.2 to 12.2 |
| Soda ash | 19 to 15.2 | 17.5 to 14.0 | 17.5 to 14.0 |
| Fluorspar | 18 | 24 | 20 |
| Feldspar | 40 | 28 | 25 |
| Kryolith | 4 | 14 | 20 |
| Zinc oxide | 4 | 4 |  |
| Niter | 2 | 3 | 5 |
| Red lead | 13 |  |  |
| Borax | 2 | 4 | 1 |
| Arsenic | 1 | 2 | 1 |

The ingredients, suitably subdivided, are thoroughly mixed together in the manner commonly employed in the glass making art. The mix then is fused in any desired manner, e. g. by heating in any known type of glass furnace. The fusion may be carried out as a batch operation or a known type of continuous glass furnace may be employed. After fusion, the fining operation and manipulation to form glass articles by blowing, pressing and the like are carried out in the usual manner. The resulting product is a superior quality opal glass, having a high luster, uniformly good opalescence and an improved, "warmer" color appearance.

The following formulas may be used for mixes for making ruby glass in accordance with the present invention:

|  |  | A | B |
|---|---|---|---|
| Sand | pounds | 100 | 100 |
| Sodium monoxide | do | 10 to 12 | 11.7 to 14.0 |
| Soda ash | do | 17 to 13.6 | 20 to 16 |
| Potash | do | 10 | |
| Zinc oxide | do | 10 | 20 |
| Feldspar | do | 10 | |
| Kryolith | do | 0.5 | 3 |
| Cadmium sulfide | do | 1.3 | 1.75 |
| Selenium | do | 1 | 2 |
| Bone ash | do | | 8 |
| Arsenic | do | 1 | 2 |
| Sulfur | ounces | | 3 |

It is to be understood that the term "glass" is used herein in its broader sense to include the various known vitreous products which may be made by fusing together siliceous and alkaline materials. For example, the present invention is excellently well adapted to make various enamel and ceramic color frits which are commonly made by fusing together silica or other siliceous material with a flux and the desired coloring agents, opacifiers, opalescing agents, etc. In adapting the present invention to this manufacture, alkali metal monoxide may be used as flux. Various other adaptations of the invention and modifications thereof will be apparent to those skilled in the glass making art.

I claim:

1. A process for making ruby glass comprising fusing together a mixture containing siliceous material, alkali metal monoxide and material containing cadmium, sulfur and selenium.

2. A process for making ruby glass comprising fusing together a mixture containing siliceous material, about 1 to 15% by weight of sodium monoxide and material containing cadmium, sulfur and selenium.

3. A process for making opal glass comprising fusing together a mixture of finely divided ingredients containing silica, soda ash, a fluoride and sodium monoxide.

FRANK J. DOBROVOLNY.